US012802961B2

(12) United States Patent
Lee et al.

(10) Patent No.: US 12,802,961 B2
(45) Date of Patent: Nov. 17, 2026

(54) DUAL SLOT DIE COATER, METHOD FOR COATING ELECTRODE ACTIVE MATERIAL SLURRY USING THE SAME AND ELECTRODE MANUFACTURED USING THE SAME

(71) Applicant: LG Energy Solution, Ltd., Seoul (KR)

(72) Inventors: Taek-Soo Lee, Daejeon (KR); Young-Gon Kim, Daejeon (KR); Young-Joon Jo, Daejeon (KR); Shin-Wook Jeon, Daejeon (KR); Jin-Ho Cho, Daejeon (KR); Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1005 days.

(21) Appl. No.: 17/911,280

(22) PCT Filed: Sep. 17, 2021

(86) PCT No.: PCT/KR2021/012833
§ 371 (c)(1),
(2) Date: Sep. 13, 2022

(87) PCT Pub. No.: WO2022/060174
PCT Pub. Date: Mar. 24, 2022

(65) Prior Publication Data
US 2023/0127571 A1 Apr. 27, 2023

(30) Foreign Application Priority Data

Sep. 17, 2020 (KR) ........................ 10-2020-0119918
Sep. 13, 2021 (KR) ........................ 10-2021-0122022

(51) Int. Cl.
*H01M 4/00* (2006.01)
*B05C 5/02* (2006.01)
(Continued)

(52) U.S. Cl.
CPC ......... *H01M 4/0404* (2013.01); *B05C 5/0254* (2013.01); *B05D 1/265* (2013.01); *H01M 4/0411* (2013.01)

(58) Field of Classification Search
CPC ... B05D 1/265; H01M 4/0404; H01M 4/0411; H01M 4/139; H01M 2004/021; Y02E 60/10
See application file for complete search history.

(56) References Cited

U.S. PATENT DOCUMENTS

2010/0285356 A1 11/2010 Choi et al.
2013/0273253 A1 10/2013 Kuniyasu et al.
(Continued)

FOREIGN PATENT DOCUMENTS

JP 2001300394 A 10/2001
JP 2003260400 A 9/2003
(Continued)

OTHER PUBLICATIONS

Matsunobe, Manufacturing Method of Electrode Plate With Separator, Aug. 2020, See the Abstract. (Year: 2020).*
(Continued)

*Primary Examiner* — Tiffany Legette
*Assistant Examiner* — Monique M Wills
(74) *Attorney, Agent, or Firm* — Lerner David LLP

(57) ABSTRACT

A dual slot die coater including a lower plate, an intermediate plate positioned on the lower plate and an upper plate positioned on the intermediate plate, a lower slot being formed between the lower plate and the intermediate plate, and an upper slot being formed between the intermediate plate and the upper plate. The lower plate, the intermediate plate and the upper plate have a lower die lip, an intermediate die lip and an upper die lip, each forming an front end with respect to the current collector, respectively, and a
(Continued)

distance between the current collector and the lower die lip is larger than a distance between the current collector and the upper die lip and a distance between the current collector and the intermediate die lip.

11 Claims, 11 Drawing Sheets

(51) Int. Cl.

| | |
|---|---|
| ***B05D 1/26*** | (2006.01) |
| ***H01M 4/04*** | (2006.01) |

(56) References Cited

U.S. PATENT DOCUMENTS

2018/0065186 A1* 3/2018 Cullinan ............. H01L 23/4985
2019/0351446 A1* 11/2019 Lee ..................... H01M 4/0404
2020/0185696 A1 6/2020 Lee et al.

FOREIGN PATENT DOCUMENTS

JP 2004066016 A 3/2004
JP 5249621 B2 7/2013
JP 2013220385 A 10/2013
JP 6367133 B2 8/2018
JP 2019107606 A 7/2019
JP 6699351 B2 5/2020
JP 2020123453 A * 8/2020
JP WO2020039990 A1 5/2021
KR 20100121387 A 11/2010
KR 20130012050 A 1/2013
KR 20170103184 A 9/2017
KR 20190019827 A 2/2019
KR 20190084471 A 7/2019
KR 20200035642 A 4/2020
KR 102143345 B1 8/2020
KR 20210043863 A 4/2021

OTHER PUBLICATIONS

Extended European Search Report including Written Opinion for Application No. 21869796.9 dated Nov. 20, 2024, pp. 1-9.

International Search Report for Application No. PCT/KR2021/012833 mailed Dec. 24, 2021, pp. 1-4.

* cited by examiner

DUAL SLOT DIE COATER, METHOD FOR COATING ELECTRODE ACTIVE MATERIAL SLURRY USING THE SAME AND ELECTRODE MANUFACTURED USING THE SAME

CROSS-REFERENCE TO RELATED APPLICATIONS

The present application is a national phase entry under 35 U.S.C. § 371 of International Application No. PCT/KR2021/012833, filed on Sep. 17, 2021, which claims priority to Korean Patent Application No. 10-2020-0119918, filed on Sep. 17, 2020, and Korean Patent Application No. 10-2021-0122022, filed on Sep. 13, 2021, the disclosures of which are incorporated herein by reference.

TECHNICAL FIELD

The present disclosure relates to a dual slot die coater capable of simultaneously forming a double layer structure, and a method for coating an electrode active material slurry using the same. More particularly, the present disclosure relates to an electrode using a dual slot die coater and a method for manufacturing the same.

BACKGROUND ART

With the increasing technology development and the growing demand for mobile devices, the demand for secondary batteries as an energy source is rapidly increasing, and secondary batteries essentially include an electrode assembly which is a power generation element. The electrode assembly includes a positive electrode, a separator, and a negative electrode stacked at least once, and the positive electrode and the negative electrode are manufactured by coating and drying a positive electrode active material slurry and a negative electrode active material slurry on a current collector made of an aluminum foil and a current collector made of a copper foil, respectively. In general, the secondary battery includes the positive electrode active material, for example, lithium containing cobalt oxide ($LiCoO_2$) of layered crystal structure, lithium containing manganese oxide, $LiMnO_2$ of layered crystal structure, $LiMn_2O_4$ of spinel crystal structure, and lithium containing nickel oxide ($LiNiO_2$). Additionally, the negative electrode active material primarily includes carbon based materials, and recently, with the growing demand for high energy lithium secondary batteries, proposals have been made to mix with silicon based materials and silicon oxide based materials having effective capacity at least 10 times higher than carbon based materials. For the uniform charging/discharging characteristics of the secondary batteries, it is necessary to uniformly coat the positive electrode active material slurry and the negative electrode active material slurry on the current collector.

To improve the performance of the secondary batteries, attention is directed to the development of an electrode structure having an active material layer of double layer structure on the current collector. To form the active material layer of double layer structure on the current collector, a dual slot die coater capable of simultaneously coating two types of electrode active material slurries may be used.

FIG. 1 shows an example of a coating method using the dual slot die coater, and FIG. 2 is an enlarged diagram of section A in FIG. 1.

Referring to FIGS. 1 and 2, two electrode active material layers may be formed on the current collector 15 at the same time by delivering two types of electrode active material slurries from the dual slot die coater 20 while moving the current collector 15 by rotation of a coating roll 10. The electrode active material slurry delivered from the dual slot die coater 20 is coated over one surface of the current collector 15 to form an electrode active material layer.

The dual slot die coater 20 is constructed by assembling three die blocks, i.e., a lower plate 25, an intermediate plate 30 and an upper plate 35. A slot is formed between the lower plate 25 and the intermediate plate 30 and a slot is formed between the intermediate plate 30 and the upper plate 35, totaling two slots, to simultaneously deliver two types of electrode active material slurries through exit ports 40, 45, each in communication with each slot, so the first electrode active material slurry 50 is coated earlier and the additional second electrode active material slurry 55 is continuously coated on the first electrode active material slurry 50, to obtain a double layer structure. The ends of the lower plate 25, the intermediate plate 30 and the upper plate 35 are disposed on the same straight line.

However, the coating method using the conventional dual slot die coater 20 includes intermittent coating in the MD direction (the lengthwise direction corresponding to the movement direction of the current collector in the continuous coating). The intermittent coating forms a pattern in an order of an active material layer, an uncoated region, an active material layer and an uncoated region on the current collector 15 by repeating the supply, stop, supply and stop of the first and second electrode active material slurries 50, 55 while moving the current collector 15.

FIG. 3 is a cross-sectional view of an electrode when intermittent coating is ideally performed. The upper and lower electrode active material slurry layers 50*a*, 55*a* in double layers are gently horizontally formed, and the end of the pattern is almost perpendicular to the current collector 15 as shown in FIG. 3.

However, in the case of the conventional dual slot die coater 20, when the supply of the electrode active material slurry is stopped, loading is smoothly stopped, and as shown at the end B of the slurry layer in the enlarged diagram of FIG. 4, a loading out phenomenon occurs on the current collector 15, resulting in low coating quality of the end.

Referring to FIG. 4, a distance L from a point Ps at which the thickness of the upper slurry layer 55*a* is reduced by the slurry delivery stop to the end of the delivered slurry, i.e., a coating ending point Pe is a loading out area. The loading out area becomes a surplus region which is wasted, and it reduces the procedural efficiency and increases the manufacturing cost.

Accordingly, there is a need for development of technology for minimizing an area which is wasted in the electrode active material slurry coating process in the manufacture of the electrode having the active material layer of the double layer structure.

DISCLOSURE

Technical Problem

The present disclosure is designed to solve the above-described problem, and therefore the present disclosure is directed to providing a dual slot die coater for preventing a loading out phenomenon and a method for coating an electrode active material slurry using the same.

The present disclosure is further directed to providing an electrode with minimized loading out area using the dual slot die coater.

However, the problems to be solved by the present disclosure are not limited to the above problems, and other problems will be clearly understood by those skilled in the art from the following detailed description.

Technical Solution

To solve the above-described problem, a dual slot die coater according to the present disclosure is a dual slot die coater including a lower slot and an upper slot, for extrusion coating of an electrode active material slurry on a surface of a continuously moving current collector through at least one of the lower slot or the upper slot, and the dual slot die coater includes a lower plate, an intermediate plate positioned on the lower plate and an upper plate positioned on the intermediate plate, the lower slot being formed between the lower plate and the intermediate plate, and the upper slot being formed between the intermediate plate and the upper plate, wherein the lower plate, the intermediate plate and the upper plate have a lower die lip, an intermediate die lip and an upper die lip, each forming an front end with respect to the current collector, respectively, and a distance between the current collector and the lower die lip is larger than a distance between the current collector and the upper die lip and a distance between the current collector and the intermediate die lip.

In the present disclosure, the dual slot die coater may further include a control unit to linearly align the lower die lip, the intermediate die lip and the upper die lip with respect to the current collector and then individually move back the lower die lip.

In the present disclosure, a lower exit port in communication with the lower slot may be formed between the lower die lip and the intermediate die lip, an upper exit port in communication with the upper slot may be formed between the intermediate die lip and the upper die lip, and a predetermined step may be formed between the lower exit port and the upper exit port.

In this instance, the lower exit port may deliver the slurry that forms the lower slurry layer onto the current collector, and the upper exit port may be spaced apart from the lower exit port downstream in a coating direction and deliver the slurry that forms the upper slurry layer onto the lower slurry layer on the current collector.

In this instance, the step preferably ranges between 20 and 70% of a sum of an average thickness of the lower slurry layer and an average thickness of the upper slurry layer.

Preferably, the lower slot and the upper slot form an angle of 30° to 60°.

In the present disclosure, the dual slot die coater may further include a first spacer interposed between the lower plate and the intermediate plate to adjust a width of the lower slot, and a second spacer interposed between the intermediate plate and the upper plate to adjust a width of the upper slot.

In the present disclosure, the lower plate may include a first manifold in communication with the lower slot to accommodate a first electrode slurry, and the upper plate may include a second manifold in communication with the upper slot to accommodate a second electrode slurry.

The present disclosure may further include a first valve to open/close the delivery through the lower exit port, a second valve to open/close the delivery through the upper exit port, and a valve control unit to control the opening/closing of the first and second valves.

To solve the above-described problem, a method for coating an electrode active material slurry according to the present disclosure includes forming an electrode active material slurry layer on a current collector by supplying an electrode active material slurry while moving the current collector from the lower die lip to the upper die lip using the dual slot die coater according to the present disclosure.

To solve the above-described problem, another method for coating an electrode active material slurry according to the present disclosure includes intermittently coating an electrode active material slurry layer on a current collector by repeating the supply and stop of an electrode active material slurry while moving the current collector from the lower die lip to the upper die lip using the dual slot die coater.

To solve the above-described problem, still another method for coating an electrode active material slurry according to the present disclosure is a coating method using a dual slot die coater including a lower slot and an upper slot, for simultaneous extrusion coating of two types of electrode active material slurries on a surface of a continuously moving current collector through the lower slot and the upper slot, the dual slot die coater including a lower plate, an intermediate plate positioned on the lower plate and an upper plate positioned on the intermediate plate, the lower slot being formed between the lower plate and the intermediate plate, and the upper slot being formed between the intermediate plate and the upper plate, wherein the lower plate, the intermediate plate and the upper plate have a lower die lip, an intermediate die lip and an upper die lip, each forming a front end with respect to the current collector, respectively, and a distance between the current collector and the lower die lip is larger than a distance between the current collector and the upper die lip and a distance between the current collector and the intermediate die lip, and the method includes simultaneously delivering the two types of electrode active material slurries on the current collector moving from the lower die lip to the upper die lip direction through a lower exit port and an upper exit port to form a double layer structure including a lower slurry layer and an upper slurry layer coated on the lower slurry layer, wherein the lower exit port in communication with the lower slot is formed between the lower die lip and the intermediate die lip, the upper exit port in communication with the upper slot is formed between the intermediate die lip and the upper die lip, and the upper exit port is spaced apart from the lower exit port downstream in a coating direction.

Here, intermittent coating may be performed by repeating simultaneous delivery of the electrode active material slurry and simultaneous stop.

A predetermined step may be formed between the lower exit port and the upper exit port, and the step may range between 20 to 70% of a sum of an average thickness of the lower slurry layer and an average thickness of the upper slurry layer.

A ratio of an average thickness of the lower slurry layer and an average thickness of the upper slurry layer may be 1:3 to 3:1.

To solve another problem, an electrode according to the present disclosure includes a current collector; and an electrode active material layer formed on the current collector, wherein the electrode active material layer includes a lower active material layer positioned adjacent to a surface of the current collector and an upper active material layer positioned on the lower active material layer, each of the lower active material layer and the upper active material layer has a flat portion and an inclined portion connected to the flat portion, the inclined portion having a smaller thickness toward a circumference, and an end of the upper active material layer on the current collector is matched with an end of the lower active material layer, or is disposed at a more outward position than the end of the lower active material layer.

A boundary of the flat portion and the inclined portion of the upper active material layer may be disposed at a more outward position than a boundary of the flat portion and the inclined portion of the lower active material layer. The inclined portion of the upper active material layer may cover the inclined portion of the lower active material layer to prevent the inclined portion of the lower active material layer from exposure to outside. A distance from the boundary the flat portion and the inclined portion of the upper active material layer to the end of the upper active material layer may be 4 mm or less.

Advantageous Effects

According to an aspect of the present disclosure, the lower die lip is disposed at a more backward position than the upper die lip and the intermediate die lip with respect to the current collector. By the step between the lips, when the supply of the electrode active material slurry is stopped, the length of loading out, not running low, is decreased. Accordingly, it is possible to prevent a loading out phenomenon and reduce the length of a loading out area, thereby increasing the cell capacity. The present disclosure does not degrade the coating quality. In particular, the present disclosure is very effective in the intermittent coating by the supply and stop of the electrode active material slurry in an alternating manner.

The present disclosure controls the step between the upper exit port and the lower exit port, and in particular, controls the lower plate which defines the lower exit port between the lower plate and the intermediate plate. The present disclosure moves the lower die lip, i.e., the lip of the lower plate backward further than the lip of the upper plate/the lip of the intermediate plate, far away from the current collector.

The dual slot die coater according to the present disclosure and the method for coating an electrode active material slurry using the same may increase the procedural efficiency and reduce the defect rate when forming the active material layer of the double layer structure on the current collector. Additionally, since the loading out area is decreased, it is possible to reduce an electrode area which is wasted after the process.

According to the present disclosure, it is possible to provide an electrode having the minimized loading out area. According to the present disclosure, since the loading out area is decreased, it is possible to reduce a surplus region which is wasted, thereby increasing the procedural efficiency and reducing the manufacturing cost.

DESCRIPTION OF DRAWINGS

The accompanying drawings illustrate a preferred embodiment of the present disclosure and together with the detailed description of the present disclosure, serve to provide further understanding of the technical features of the present disclosure, and thus, the present disclosure is not construed as being limited to the drawings.

FIGS. *8a* and *8b* are schematic cross-sectional views of an electrode manufactured by a method for coating an electrode active material slurry according to an embodiment of the present disclosure.

Figure 9:
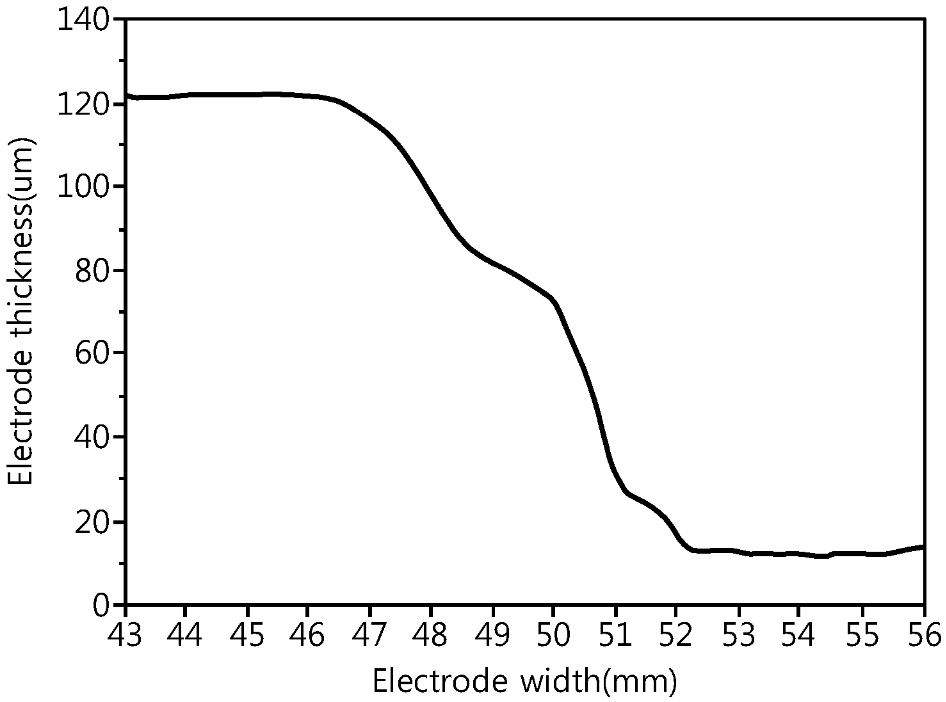
Figure 10:
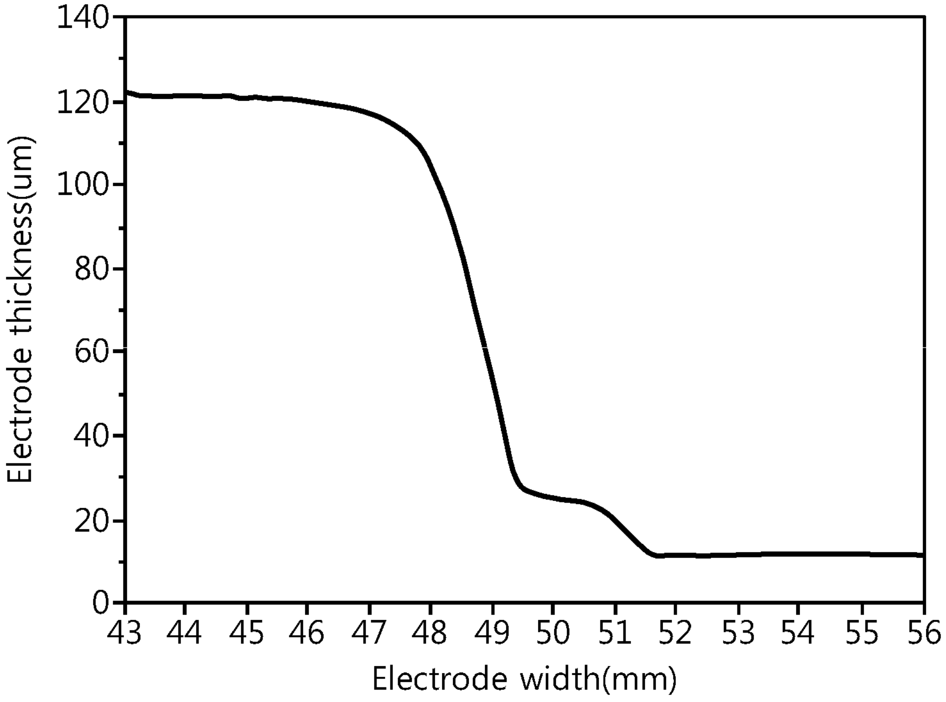

FIGS. 9 and 10 are width to thickness graphs in cross section of an electrode according to comparative example and example.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just some preferred embodiments of the present disclosure and do not fully describe the technical features of the present disclosure, so it should be understood that a variety of other equivalents and modifications could have been made thereto at the time of filing the patent application.

A dual slot die coater of the present disclosure is an apparatus including a lower slot and an upper slot to coat a coating solution in a double layer on a substrate. The 'substrate' described below is a current collector and the coating solution is an 'electrode active material slurry'. The slurry delivered through the lower slot and the slurry delivered through the upper slot may be electrode active material slurries having the same or different compositions (types of an active material, a conductive material and a binder), amounts (amounts of the active material, the conductive material and the binder) or properties. The dual slot die coater of the present disclosure is optimized for electrodes manufactured by simultaneous coating of two types of electrode active material slurries, or pattern coating by coating two types of electrode active material slurries in an alternating manner, or intermittent coating by the supply and stop of two types of electrode active material slurries in an alternating manner. However, the scope of the present disclosure is not necessarily limited thereto.

Figure 4:
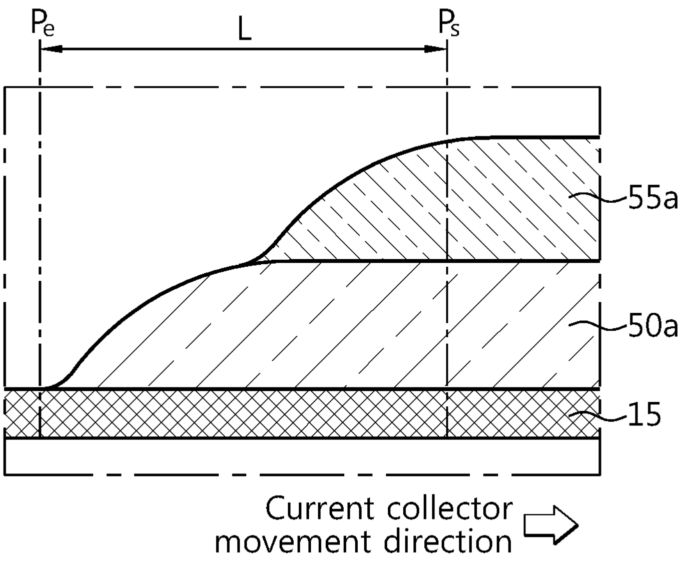
FIG. 4 is a schematic cross-sectional view of an electrode manufactured by a conventional method for coating an electrode active material slurry.

For conventional intermittent coating, when the slurry supply is stopped during the pattern formation, loading runs low and the loading out phenomenon described in FIG. 4 occurs. The inventors found that the loading out phenomenon is a phenomenon occurring in case that the residual slurries forming menisci or beads between the dual slot die coater and the current collector are coated on the current collector when the slurry supply is stopped for end formation. Accordingly, the inventors have studied a structure for minimizing the slurries remaining between the dual slot die coater and the current collector, and propose the dual slot die coater according to the present disclosure.

Figure 5:
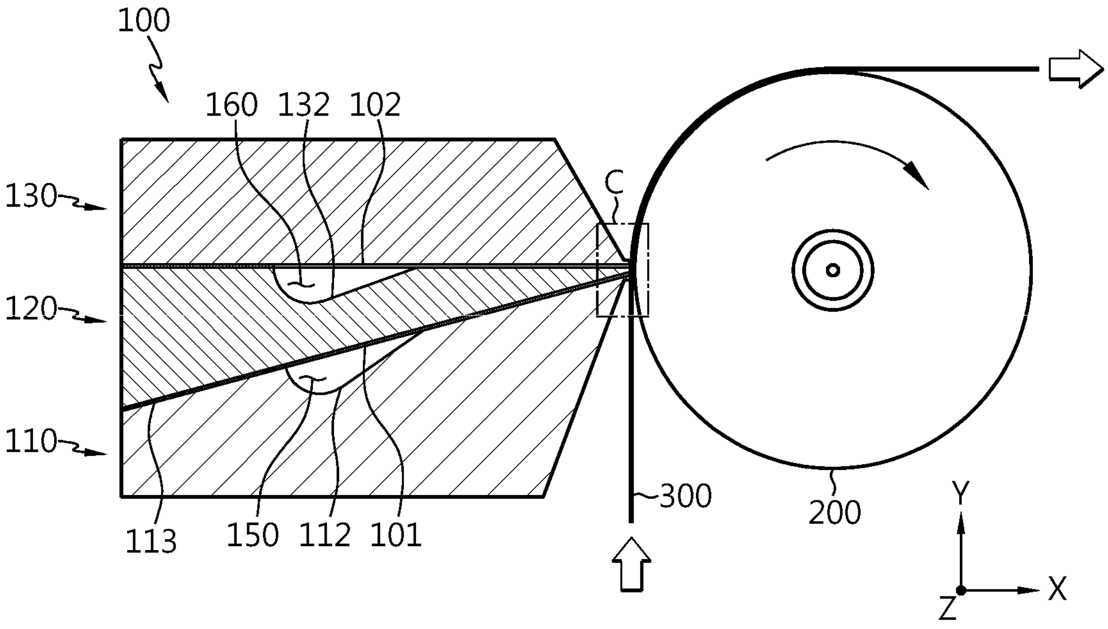
FIG. 5 is a schematic cross-sectional view of a dual slot die coater according to an embodiment of the present disclosure.
Figure 6:
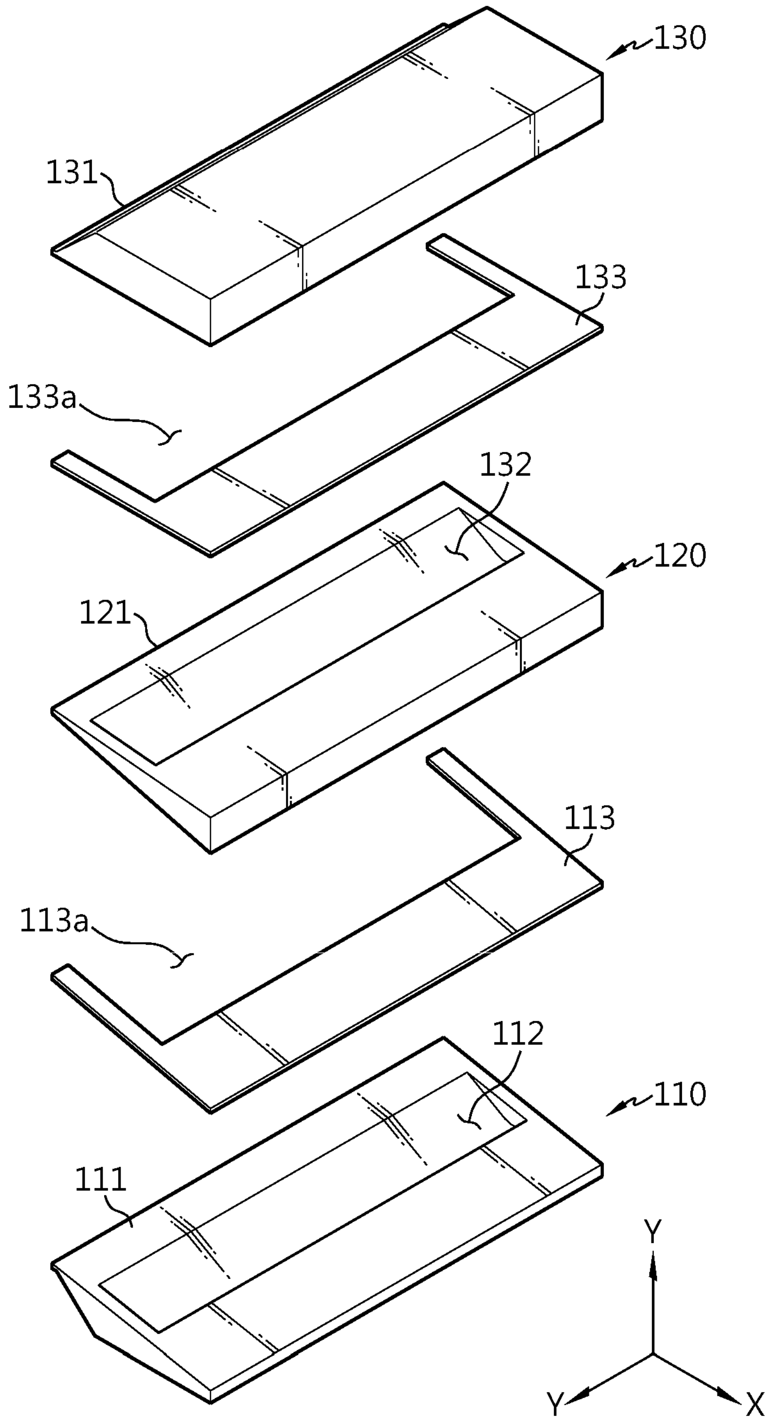
FIG. 6 is a schematic exploded perspective view of a dual slot die coater according to an embodiment of the present disclosure.
Figure 7:
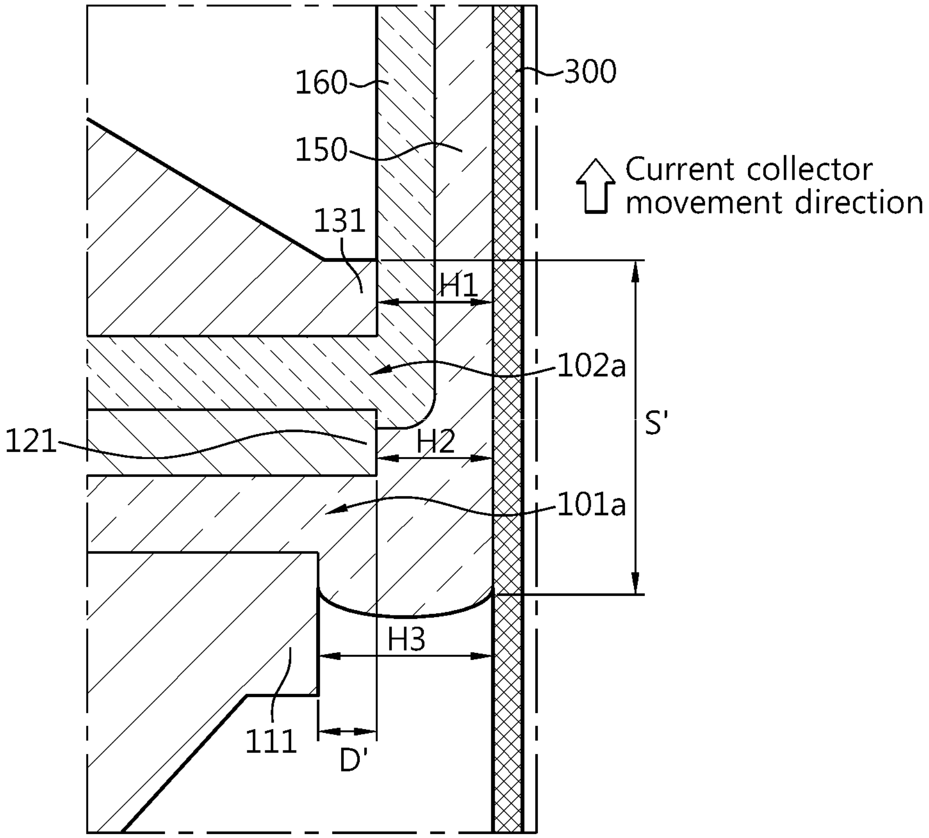
FIG. 7 is an enlarged diagram of section C in FIG. 5, showing an electrode active material slurry coating process using a dual slot die coater according to an embodiment of the present disclosure.

FIG. 5 is a schematic cross-sectional view of the dual slot die coater according to an embodiment of the present disclosure. FIG. 6 is a schematic exploded perspective view of the dual slot die coater according to an embodiment of the present disclosure. FIG. 7 is an enlarged diagram of section C in FIG. 5, showing an electrode active material slurry coating process using the dual slot die coater according to an embodiment of the present disclosure.

Referring to FIGS. 5 to 7, the dual slot die coater 100 according to the present disclosure includes a lower slot 101 and an upper slot 102, and is an apparatus capable of simultaneously, alternately or intermittently coating a same type of electrode active material slurry or two different types of electrode active material slurries on a current collector 300 through the lower slot 101 and the upper slot 102.

The dual slot die coater 100 includes a lower plate 110, an intermediate plate 120 positioned on the lower plate 110 and an upper plate 130 positioned on the intermediate plate 120. The lower plate 110, the intermediate plate 120 and the upper plate 130 are assembled through fasteners such as bolts. The lower plate 110 is the lowermost block among the blocks of the dual slot die coater 100, and the surface facing the intermediate plate 120 is inclined at an angle of approximately 30° to 60° to the bottom surface (X-Z plane).

The lower slot 101 may be formed at a location in which the lower plate 110 and the intermediate plate 120 face each other. For example, a first spacer 113 is interposed between the lower plate 110 and the intermediate plate 120 to form a gap between, and the lower slot 101 corresponding to a passage for the flow of a first electrode active material slurry 150 may be formed. In this case, the thickness of the first spacer 113 determines the vertical width (Y-axis direction, a slot gap) of the lower slot 101.

As shown in FIG. 6, the first spacer 113 has a first opening portion 113*a* which is cut at an area, and may be interposed in the remaining portion except one side in the edge area of the facing surface of each of the lower plate 110 and the intermediate plate 120. Accordingly, a lower exit port 101*a* through which the first electrode active material slurry 150 emerges is only formed between the front end of the lower plate 110 and the front end of the intermediate plate 120. The front end of the lower plate 110 and the front end of the intermediate plate 120 are defined as a lower die lip 111 and an intermediate die lip 121, respectively, and in other words, the lower exit port 101*a* is formed by the spacing between the lower die lip 111 and the intermediate die lip 121.

For reference, the first spacer 113 acts as a gasket to prevent the leakage of the first electrode active material slurry 150 through the gap between the lower plate 110 and the intermediate plate 120 except the area where the lower exit port 101*a* is formed, and thus the first spacer 113 is preferably made of a material having sealing ability.

The lower plate 110 includes a first manifold 112 having a predetermined depth on the surface facing the intermediate plate 120, and the first manifold 112 is in communication with the lower slot 101. Although not shown in the drawing, the first manifold 112 is connected to a first electrode active material slurry supply chamber (not shown) installed outside with a supply pipe and is supplied with the first electrode active material slurry 150. When the first manifold 112 is fully filled with the first electrode active material slurry 150, the flow of the first electrode active material slurry 150 is guided along the lower slot 101 and comes out of the lower exit port 101*a*.

The intermediate plate 120 is a block disposed in the middle of the die blocks of the dual slot die coater 100, and is interposed between the lower plate 110 and the upper plate 130 to form a dual slot. The intermediate plate 120 of this embodiment is a right-angled triangle in cross section, but is not necessarily limited thereto, and for example, the intermediate plate 120 may be, for example, an isosceles triangle in cross section.

The upper plate 130 is positioned facing the upper surface of the intermediate plate 120 parallel to the bottom surface. As described above, the upper slot 102 is formed at a location in which the intermediate plate 120 and the upper plate 130 face each other.

In the same way as the lower slot 101 described above, a second spacer 133 may be interposed between the intermediate plate 120 and the upper plate 130 to form a gap between. Accordingly, the upper slot 102 corresponding to a passage for the flow of a second electrode active material slurry 160 is formed. In this case, the vertical width (Y-axis direction, a slot gap) of the upper slot 102 is determined by the second spacer 133.

In addition, the second spacer 133 having the similar structure to the first spacer 113 has a second opening portion 133*a* which is cut at an area, and is interposed in the remaining portion except one side in the edge area of the facing surface of each of the intermediate plate 120 and the upper plate 130. Likewise, the circumferential direction except the front side of the upper slot 102 is blocked, and the upper exit port 102*a* is only formed between the front end of the intermediate plate 120 and the front end of the upper plate 130. The front end of the upper plate 130 is defined as an upper die lip 131, and in other words, the upper exit port 102*a* is formed by the spacing between the intermediate die lip 121 and the upper die lip 131.

In addition, the upper plate 130 includes a second manifold 132 having a predetermined depth on the surface facing the intermediate plate 120, and the second manifold 132 is in communication with the upper slot 102. Although not shown in the drawings, the second manifold 132 is connected to a supply chamber for the second electrode active material slurry 160 installed outside with a supply pipe and is supplied with the second electrode active material slurry 160. When the second electrode active material slurry 160 is supplied from the external source along the supply pipe, and the second manifold 132 is fully filled with the second electrode active material slurry 160, the flow of the second electrode active material slurry 160 is guided along the upper slot 102 in communication with the second manifold 132 and comes out of the upper exit port 102*a*.

The upper slot 102 and the lower slot 101 form an angle, and the angle may be approximately 30° to 60°. The upper slot 102 and the lower slot 101 may intersect at one point, and the upper exit port 102*a* and the lower exit port 101*a* may be provided near the intersection point. Accordingly, the locations at which the first electrode active material slurry 150 and the second electrode active material slurry 160 emerge may be concentrated on approximately one point.

The first and second manifolds 112, 132 are formed in the lower plate 110 and the upper plate 130, respectively. In this case, the intermediate plate 120 that is the most structurally vulnerable may be less affected. Meanwhile, the dual slot die coater 100 may further include a first valve to open/close the delivery through the lower exit port 101*a,* a second valve to open/close the delivery through the upper exit port 102*a,* and a valve control unit to control the opening/closing of the first and second valves.

According to the dual slot die coater 100 having the above-described configuration, a rotatable coating roll 200 is positioned on the front side of the dual slot die coater 100, and the coating roll 200 may be rotated to move the current collector 300 to be coated, while continuously contacting the first electrode active material slurry 150 and the second electrode active material slurry 160 with the surface of the current collector 300, and thereby the current collector 300 may be simultaneously coated in a double layer structure. Alternatively, pattern coating may be intermittently formed on the current collector 300 by performing the supply and stop of the first electrode active material slurry 150 and the supply and stop of the second electrode active material slurry 160 in an alternating manner by the closing/opening control of the first and second valves through the valve control unit.

Referring further to FIG. 7, the structure of the die lip of the dual slot die coater according to an embodiment of the present disclosure and a method for coating an electrode active material slurry using the dual slot die coater will be described in detail. The dual slot die coater 100 according to the present disclosure has a lip step of upper/intermediate/lower plate.

The distance H3 between the current collector 300 and the lower die lip 111 is larger than the distance H1 between the current collector 300 and the upper die lip 131, and the distance H2 between the current collector 300 and the intermediate die lip 121. This distance difference may be formed by moving back the lower die lip 111 which is the lip of the lower plate 110 in a direction that is opposite to the delivery direction than the upper die lip 131 which is the lip of the upper plate 130 and the intermediate die lip 121 which is the lip of the intermediate plate 120, far away from the current collector 300, to form the lip step. It is possible to reduce the loading out area through the step between the lips. The distance H1 between the current collector 300 and the upper die lip 131 may be equal to the distance H2 between the current collector 300 and the intermediate die lip 121.

To form the lip step, the dual slot die coater 100 may further include a control unit to individually move back the lower die lip 111 after placing the lower die lip 111, the intermediate die lip 121 and the upper die lip 131 in linear alignment with respect to the current collector 300. In this configuration, the lower die lip 111 is disposed at a more rearward position from the current collector 300 than the upper die lip 131 and the intermediate die lip 121.

Accordingly, the predetermined step D' is formed between the lower exit port 101*a* and the upper exit port 102*a*. The step D' is a result of subtracting the distance H1 between the current collector 300 and the upper die lip 131 from the distance H3 between the current collector 300 and the lower die lip 111. The lower exit port 101*a* and the upper exit port 102*a* are spaced by the step D' apart from each other along the horizontal direction, thereby preventing the second electrode active material slurry 160 coming out of the upper exit port 102*a* from entering the lower exit port 101*a,* or the first electrode active material slurry 150 coming out of the lower exit port 101*a* from entering the upper exit port 102*a*. The present disclosure is characterized in that the intermediate plate 120 and the lower plate 110 forming the lower exit port 101*a* are spaced apart from each other.

As shown in the drawing, when the lip positions are set, the upper exit port 102*a* is spaced apart from the lower exit port 101*a* downstream of the coating direction. An active material layer may be formed with the double layer structure on the current collector 300 by simultaneously delivering the slurries 150, 160 through the lower exit port 101*a* and the upper exit port 102*a* while moving the current collector 300 from the lower die lip 111 to the upper die lip 131.

The present disclosure moves only the lower layer upstream far away from the current collector 300 on the basis of the lower layer slurry, i.e., the first electrode active material slurry 150 issuing from the lower exit port 101*a*. In other words, the present disclosure moves the lower plate 110 far away from the current collector 300 to form a height difference between the intermediate plate 120 and the lower plate 110, i.e., two plates that form the lower exit port 101*a*. It is different from the movement of the exit port itself no matter whether it is upstream or downstream.

Figure 8A:
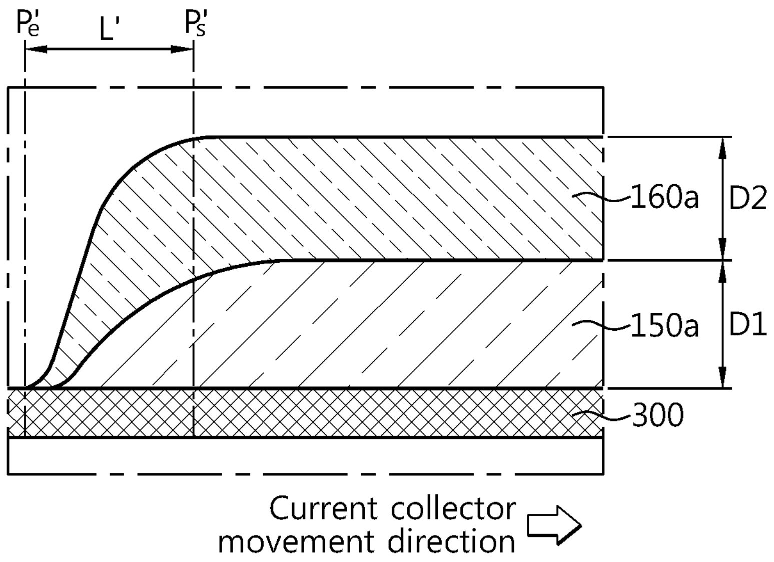
Figure 8B:
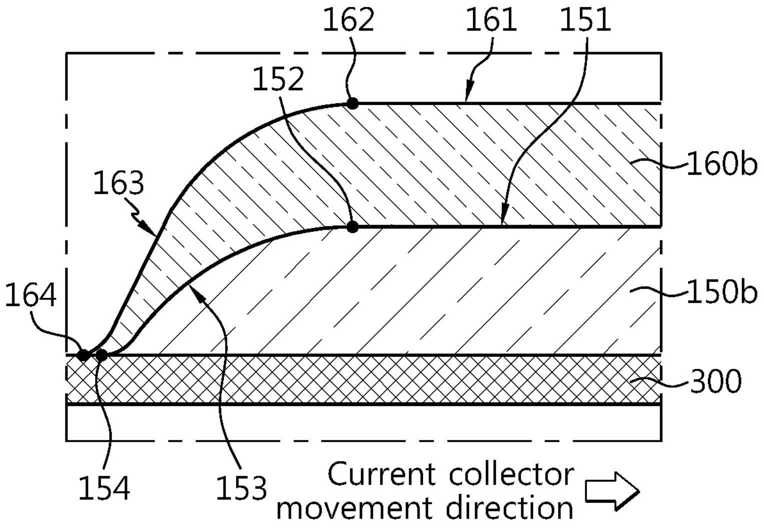

FIGS. 8*a* and 8*b* are diagrams showing the cross section of an electrode manufactured by the method for coating an electrode active material slurry according to an embodiment of the present disclosure. FIG. 8*a* shows the cross section after electrode active material slurry coating, and FIG. 8*b* shows the cross section after coating and drying.

As shown in FIG. 8*a*, the first electrode active material slurry 150 issuing from the lower exit port 101*a* is coated on the current collector 300 to form a lower slurry layer 150*a,* and at the same time, the second electrode active material slurry 160 issuing from the upper exit port 102*a* is coated thereon to form an upper slurry layer 160*a*. Using the dual slot die coater 100 of the present disclosure, a double layer structure including the upper slurry layer 160*a* on the lower slurry layer 150*a* may be formed. In particular, when the supply of the first electrode active material slurry 150 and the second electrode active material slurry 160 is stopped at the same time, a pattern end shown in FIG. 8*a* may be obtained by the lip step of the dual slot die coater 100, and after performing drying or further performing roll pressing, a pattern end shown in FIG. 8*b* may be obtained. The roll pressing is an optional step that may be performed to adjust the thickness.

A ratio of the average thickness D1 of the lower slurry layer 150*a* formed by the first electrode active material slurry 150 emerging through the lower exit port 101*a* and the average thickness D2 of the upper slurry layer 160*a* formed by the second electrode active material slurry 160 emerging through the upper exit port 102*a* ranges between 1:3 and 3:1 (D1:D2). The thickness ratio is a relative representation of an average of the thickness-wise lengths of each layer. Additionally, each of the average thickness D1 of the lower slurry layer 150*a* and the average thickness D2 of the upper slurry layer 160*a* may be 40 to 200 μm.

The thickness of the slurry layers 150*a,* 160*a* may be the pressure of the slurry that will be supplied shortly. In case that the pressure of the second electrode active material slurry 160 is supplied 3 times higher than the pressure of the first electrode active material slurry 150 so that the thickness ratio of the lower slurry layer 150*a* and the upper slurry layer 160*a* is 1:3 or more, the pressure of the upper layer is stronger than the pressure of the upper layer, so the first electrode active material slurry 150 is pushed back in a direction that is opposite to the coating direction, there is a high leaking likelihood, and the first electrode active material slurry 150 is not properly supplied due to the strong pressure of the second electrode active material slurry 160. Additionally, due to the high pressure of the second electrode active material slurry 160, the supply of the first electrode active material slurry 150 is not uniform, which makes it difficult to uniformly form the lower slurry layer 150*a*.

Meanwhile, when the pressure of the second electrode active material slurry 160 is supplied 3 times higher than the pressure of the first electrode active material slurry 150 so that the thickness ratio of the lower slurry layer 150*a* and the upper slurry layer 160*a*, the second electrode active material slurry 160 may not be properly supplied or the second electrode active material slurry 160 may not be uniformly coated in the coating direction, resulting in the non-uniform coating solution surface.

The step D' preferably ranges between 20 and 70% of the sum of the average thickness D1 of the lower slurry layer 150*a* and the average thickness D2 of the upper slurry layer 160*a*. When the range is less than 20%, it is less effective in reducing the loading out length when the slurry supply is stopped. When the range exceeds 70%, the entire area of a space in which the slurry resides prior to coating, i.e., a space between the die lips 111, 121 and the lower slurry layer 150*a* is very small compared to the amount of the slurry, and thus the first electrode active material slurry 150 being supplied is not coated and it leaks back. The leaking refers to instability caused by the upstream loss of some of the slurry out of the lower die lip. This refers to the loss of the pre-metered slurry, and it is impossible to estimate the final coating thickness.

Conventionally, for intermittent coating, when the slurry supply is stopped during pattern formation, loading runs low and a loading out phenomenon occurs. Referring back to FIG. 2 showing the conventional art, the inventors found that the loading out phenomenon is a phenomenon occurring in case that the residual slurries 50, 55 forming menisci or beads between the dual slot die coater 20 and the current collector 15 are coated on the current collector 15 when the slurry supply is stopped for end formation. In particular, they found that the length S from the front end of the upper plate 35 to the meniscus of the first electrode active material slurry 50 is relevant to the length of the loading out area.

Since the lower plate 110 is moved back as shown in FIG. 7, the present disclosure reduces the amount of the residual slurries forming menisci or beads between the dual slot die coater 100 and the current collector 300. It is because the length S' from the upper die lip 131 at the front end of the upper plate 130 to the meniscus of the first electrode active material slurry 150 is shorter than the length S of FIG. 2. Accordingly, it is possible to reduce the loading out length where loading does not run low when the slurry supply is stopped. Accordingly, the pattern end can be ideally formed as shown in FIGS. 8*a* and 8*b*.

Referring to FIG. 8*a*, the lower slurry layer 150*a* and the upper slurry layer 160*a* are formed on the current collector 300 by coating along the movement direction of the current collector almost in a sequential order. In the present disclosure, the distance L' from a point Ps' at which the thickness of the upper slurry layer 160*a* starts to decrease by the slurry delivery stop to the end of the delivered slurry, i.e., a coating ending point Pe' is the loading out area, and it is much shorter than the distance L of the loading out area of FIG. 4 according to the conventional art. The loading out area acts as a surplus region which is wasted, and this reduces the procedural efficiency and increases the manufacturing cost. According to the present disclosure, since the loading out area decreases, it is possible to reduce the surplus region which is wasted, thereby increasing the procedural efficiency and reducing the manufacturing cost.

Conventionally, the distance L of the loading out area of FIG. 4 is generally 5.5 mm or more. However, using the dual slot die coater 100 according to the present disclosure, the surplus region, i.e., the distance L' from the point Ps' at which the thickness of the upper slurry layer 160*a* starts to decrease by the slurry delivery stop to the end of the delivered slurry, i.e., the coating ending point Pe', may be adjusted to 4 mm or less. When the length of the surplus region exceeds 4 mm, the wasted area increases, resulting in low economical efficiency.

For example, the method for coating an electrode active material slurry of the present disclosure may be applied to the manufacture of the positive electrode of the secondary battery. The positive electrode includes a positive electrode active material layer formed on the surface of the current collector and the current collector. The current collector may include any material which exhibits electrical conductivity, for example, Al, Cu, and a proper one may be used according to the polarity of the current collector of the electrode well known in the field of secondary batteries. The positive electrode active material layer may further include at least one of a positive electrode active material particles, a conductive material or a binder. Additionally, the positive electrode may further include various types of additives to enhance or improve the electrical and chemical properties.

The active material is not limited to a particular type and may include any material that may be used as positive electrode active materials of lithium ion secondary batteries. Its non-limiting example may include at least one of layered compounds or compounds with one or more transition metal substitution such as lithium manganese composite oxide ($LiMn_2O_4$, $LiMnO_2$), lithium cobalt oxide ($LiCoO_2$), lithium nickel oxide ($LiNiO_2$); lithium manganese oxide of formula $Li_{1+x}Mn_{2-x}O_4$ (x is 0~0.33), $LiMnO_3$, $LiMn_2O_3$, $LiMnO_2$; lithium copper oxide ($Li_2CuO_2$); vanadium oxide, for example, $LiV_3O_8$, $LiV_3O_4$, $V_2O_5$, $Cu_2V_2O_7$; Ni site lithium nickel oxide represented by formula $LiNi_{1-x}M_xO_2$ (M═Co, Mn, Al, Cu, Fe, Mg, B or Ga, x=0.01~0.3); lithium manganese composite oxide represented by formula $LiMn_{2-x}M_xO_2$ (M═Co, Ni, Fe, Cr, Zn or Ta, x=0.01~0.1) or $Li_2Mn_3MO_8$ (M═Fe, Co, Ni, Cu or Zn); $LiMn_2O_4$ with partial substitution of alkali earth metal ion for Li in the formula; disulfide compounds; or $Fe_2(MoO_4)_3$. In the present disclosure, the positive electrode may include a solid electrolyte material, for example, at least one of a polymer based solid electrolyte, an oxide based solid electrolyte or a sulfide based solid electrolyte.

The conductive material may be typically added in an amount of 1 wt % to 20 wt % based on the total weight of the mixture including the electrode active material. The conductive material is not limited to a particular type, and may include any material having conductive properties without causing any chemical change to the corresponding battery, for example, at least one selected from graphite, for example, natural graphite or artificial graphite; carbon black, for example, carbon black, acetylene black, ketjen black, channel black, furnace black, lamp black, thermal black; conductive fibers, for example, carbon fibers or metal fibers; metal powder, for example, carbon fluoride, aluminum and nickel powder; conductive whiskers, for example, zinc oxide and potassium titanate; conductive metal oxide, for example, titanium oxide; and conductive materials, for example, polyphenylene derivatives.

The binder is not limited to a particular type and may include any material which assists in bonding the active material and the conductive material and bonding to the current collector, for example, polyvinylidene fluoride polyvinylalcohol, carboxymethylcellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene butadiene rubber, fluoro rubber and a variety of copolymers thereof. The binder may be typically included in the range of 1 wt % to 30 wt % or 1 wt % to 10 wt % based on 100 wt % of the electrode layer.

The electrode may be a negative electrode. The negative electrode includes a current collector and a negative electrode active material layer formed on the surface of the current collector. The negative electrode active material layer may further include at least one of negative electrode active material particles, a conductive material or a binder. Additionally, the negative electrode may further include a variety of additives to enhance or improve the electrical and chemical properties.

The negative electrode active material may include carbon materials, for example, graphite, amorphous carbon, diamond phase carbon, fullerene, carbon nanotubes and carbon nanohorns, lithium metal materials, alloy based materials, for example, silicon or tin alloy based materials, oxide based materials, for example, $Nb_2O_5$, $Li_5Ti_4O_{12}$, $TiO_2$, or a composite thereof. For the conductive material, the binder and the current collector of the negative electrode, a reference may be made to the positive electrode. In particular, the electrode manufactured according to the present disclosure is preferably a negative electrode.

The electrode of FIG. 8*b* may be manufactured by drying the result of coating as shown in FIG. 8*a*.

Referring to FIG. 8*b*, the electrode according to an embodiment of the present disclosure includes a current collector 300 and an electrode active material layer formed on the current collector 300. In particular, the electrode active material layer includes a lower active material layer 150*b* positioned adjacent to the surface of the current collector 300 and an upper active material layer 160*b* positioned on the lower active material layer 150*b*. That is, the electrode active material layer has a structure in which the upper active material layer 160*b* is stacked on the lower active material layer 150*b* in that order. The lower active material layer 150*b* is the result of drying the lower slurry layer 150*a*, the upper active material layer 160*b* is the result of drying the upper slurry layer 160*a*.

For example, the lower active material layer 150*b* contains a conductive material in a larger amount, and the upper active material layer 160*b* may contain a conductive material in a smaller amount. In this case, the amount of the conductive material in the lower active material layer 150*b* may be adjusted to the range between 0.5 and 5 weight %. It is possible to increase the amount of the active material on the electrode surface and reduce the electrical conductivity at a predetermined level by reducing the amount the conductive material in the upper active material layer 160*b*. In particular, when the amount of the conductive material in the upper active material layer 160*b* is controlled to a very low level of 0.02 weight % or less, it is possible to reduce the heat generation reaction in the event of an internal short circuit of the cell.

In another example, the average particle size P1 of the active material that forms the lower active material layer 150*b* ranges between 50 and 95% of the average particle size P2 of the active material that forms the upper active material layer 160*b*. In this case, a smaller particle size active material is applied to the lower active material layer 150*b*, and a larger particle size active material is applied to the upper active material layer 160*b*, which makes electrolyte solution wetting easy and induces the smooth movement of ions or holes.

In the illustrated example, the lower active material layer 150*b* and the upper active material layer 160*b* have flat portions 151, 161 and inclined portions 153, 163 connected to the flat portions 151, 161, respectively, and the inclined portions 153, 163 have a smaller thickness toward the circumference. The boundary of the flat portions 151, 161 and the inclined portions 153, 163 is the points 152, 162 at which the thickness of each layer starts to decrease, and refers to a location at which the flat portions 151, 161 end and the inclined portions 153, 163 start.

Figure 3:
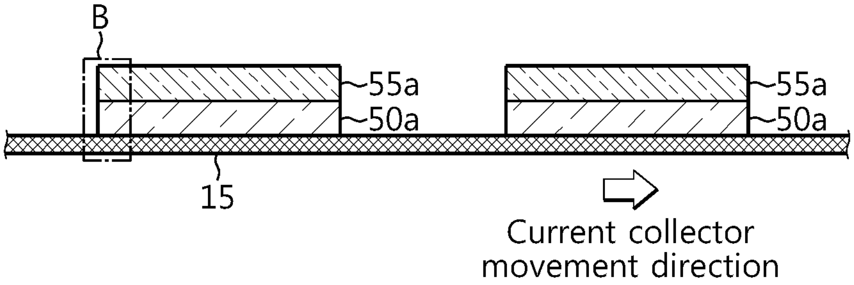
FIG. 3 is a cross-sectional view of an electrode when intermittent coating is ideally performed.

Preferably, an end 164 of the upper active material layer 160*b* and an end 154 of the lower active material layer 150*b* at which the thickness of each layer is 0 are aligned and matched at the location at which the end of the pattern is almost perpendicular to the current collector 300 as shown in FIG. 3 or they are matched to each other on the current collector 300, but the end 164 of the upper active material layer 160*b* may be disposed at a more outward position than the end 154 of the lower active material layer 150*b* on the current collector 300 as shown. The end 164 of the upper active material layer 160*b* on the current collector 300 may be matched with the end 154 of the lower active material layer 150*b*.

The points 152, 162 at which the thickness of each layer starts to decrease may be aligned and matched at the almost perpendicular location to the current collector 300, but the point 162 at which the thickness of the upper active material layer 160*b* starts to decrease may be disposed at a more outward position than the point 152 at which the thickness of the lower active material layer 150*b* starts to decrease as shown.

The inclined portion 163 of the upper active material layer 160*b* and the inclined portion 153 of the lower active material layer 150*b* are not connected to each other, and the inclined portion 163 of the upper active material layer 160*b* covers the inclined portion 153 of the lower active material layer 150*b*, to form a gentle or sharp slope without a step. There is no step formed by the connected inclined portions of each layer as shown in FIG. 4. FIG. 4 shows that the upper layer end is disposed at a more inward position than the lower layer end, and part of the inclined portion of the lower layer is exposed to outside, to form a step. In the electrode according to the present disclosure, in particular, as a result of reducing the loading out length of the lower slurry layer when the slurry supply is stopped, the end 164 of the upper active material layer 160*b* and the end 154 of the lower active material layer 150*b* are matched to each other, or the end 164 of the upper active material layer 160*b* is disposed at a more outward position than the end 154 of the lower active material layer 150*b*, and thus the inclined portion of the lower layer is not exposed to outside.

Using the dual slot die coater 100 according to the present disclosure as described above, the surplus region, i.e., the distance L' from the point Ps' at which the thickness of the upper slurry layer 160*a* starts to decrease by the slurry delivery stop to the end of the delivered slurry, i.e., the coating ending point Pe' may be adjusted to 4 mm or less. As a result, the distance from the boundary of the flat portion 161 and the inclined portion 163 of the upper active material layer 160*b* to the end 164 of the upper active material layer 160*b* may be 4 mm or less.

As described above, according to the present disclosure, there is an electrode with the minimized loading out area. According to the present disclosure, since the loading out area decreases, it is possible to reduce the surplus region which is wasted, thereby increasing the procedural efficiency and reducing the manufacturing cost.

The electrode according to the present disclosure may be used to manufacture a secondary battery. The electrode according to the present disclosure may be a positive electrode or a negative electrode. A separator is interposed between the positive electrode and the negative electrode to separate the positive electrode from the negative electrode. Preferably, the width of the positive electrode is shorter than the width of the negative electrode, and the N/P ratio is 100 to 115%. The width of the positive electrode and the width of the negative electrode do not refer to the width of the current collector, and refer to the outermost end coated with the electrode active material in each electrode. That is, it is the boundary of the uncoated region and the coated region. For example, the outermost end of the positive electrode may be shorter by 1.0+/−0.6 mm than the outermost end of the negative electrode. The width of the positive electrode and the width of the negative electrode are designed such that the negative electrode accommodates lithium ions moving from the positive electrode to the maximum extent (up to 100%).

The separator may include any type of separator which separates the positive electrode from the negative electrode and provides a passage through which an ion moves, commonly used in the field of secondary batteries. For example, the separator may typically include a porous membrane, a woven fabric and a nonwoven fabric made of resin, and the resin may include, for example, polyolefin resin such as polypropylene or polyethylene, polyester resin, acrylic resin, styrene resin, or nylon resin. In particular, the polyolefin based microporous membrane is desirable due to its ion permeability and good performance of physically separating the positive electrode from the negative electrode. Additionally, the separator may have a coating layer including inorganic particles if necessary, and the inorganic particles may include insulating oxide, nitride, sulfide and carbide, and preferably $TiO_2$ or $Al_2O_3$.

The secondary battery further includes an electrolyte solution. The electrolyte solution may include at least one type of organic solvent of cyclic carbonates including ethylene carbonate, propylene carbonate, vinylene carbonate and butylene carbonate, chain carbonates including ethylmethylcarbonate (EMC), diethylcarbonate (DEC), dimethylcarbonate (DMC) and dipropyl carbonate (DPC), aliphatic carboxylate esters, γ-lactones including γ-butyrolactone, chain ethers or cyclic ethers. Additionally, a lithium salt may be dissolved in these organic solvents.

Hereinafter, the present disclosure will be described in more detail through experimental examples.

COMPARATIVE EXAMPLE

Figure 1:
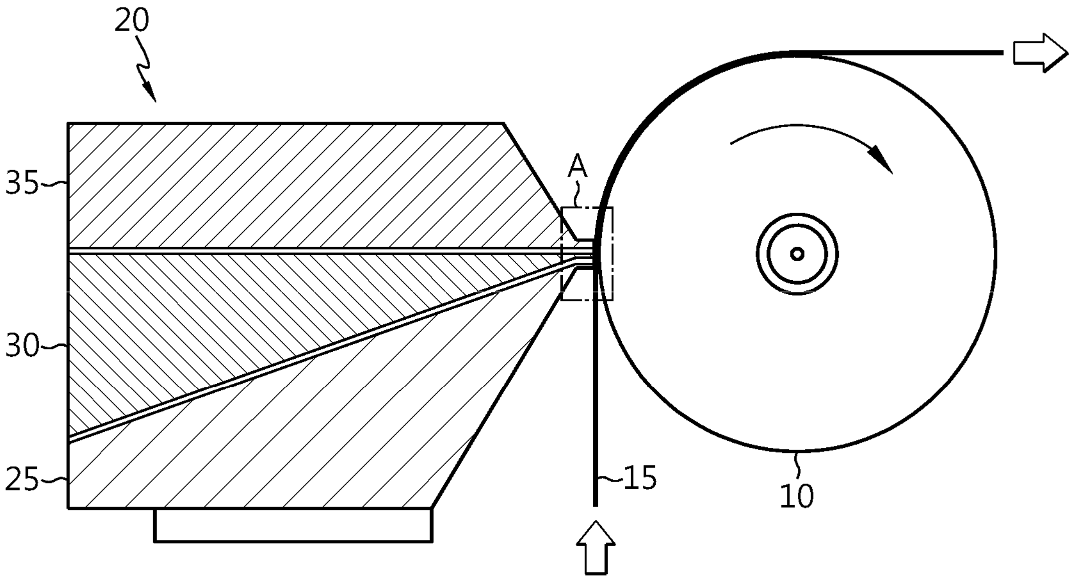
FIG. 1 is a schematic cross-sectional view of a conventional dual slot die coater.
Figure 2:
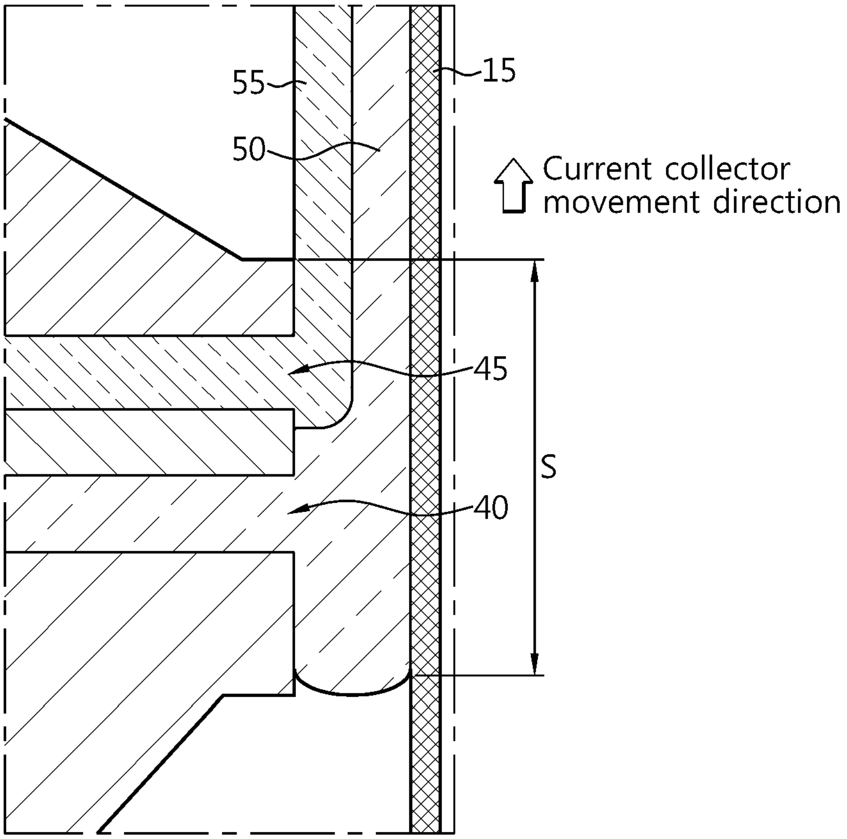
FIG. 2 is an enlarged diagram of section A in FIG. 1.

A slurry layer of a double layer structure is coated on a current collector using the conventional dual slot die coater 20 shown in FIG. 2. The ends of the lower plate 25, the intermediate plate 30 and the upper plate 35 are disposed on the same straight line, and the distance from the current collector is 150 μm. The movement speed of the current collector is 50 m/min. FIG. 9 is a width to thickness graph in the cross section of the electrode by comparative example. The total average thickness of the slurry layer of the double layer structure coated through comparative example is about 121.7 μm. The loading out start point (Ps in FIG. 4) is determined as a location corresponding to 95% of the average coating thickness at the x coordinate the graph of FIG. 9. The point is 47 mm. The coating end point (Pe in FIG. 4) is where the coating amount is 0 (thickness is 0) at the x coordinate of the graph of FIG. 9, and it is found to be 53 mm. The loading out area (L in FIG. 4) is calculated as 53 mm-47 mm, and thus the result is found to be 6 mm.

Example 1

A slurry layer of a double layer structure is coated on a current collector using the dual slot die coater 100 shown in FIG. 7. The lower die lip 111 is moved further back than the intermediate die lip 121 or the upper die lip 131. The distance between the intermediate die lip 121 and the upper die lip 131 and the current collector is 150 μm which is equal to comparative example, and the step D' between the upper slot 102 and the lower slot 101 is 60 μm. The movement speed of the current collector is 50 m/min.

FIG. 10 is a width to thickness graph in the cross section of the electrode by example. The total average thickness of the slurry double layer coated through example is about 121.3 μm, which is almost similar to comparative example. The loading out start point (Ps' in FIG. 8) is a location corresponding to 95% of the average coating thickness at the x coordinate of the graph of FIG. 10, and it is found to be 47.8 mm. The coating end point (Pe' in FIG. 8) is where the coating amount is 0 (0 in thickness) at the x coordinate of the graph of FIG. 10, and it is found to be 51.6 mm. The result reveals that the loading out area (L' in FIG. 8) is 51.6 mm-47.8 mm, which equals 3.8 mm.

The coating of the electrode active material slurry layer by this embodiment as described above decreases the length of the surplus region, and as a consequence, reduces the wasted region, thereby increasing the procedural efficiency.

Example 2

A slurry layer of a double layer structure is coated on a current collector using the dual slot die coater 100 of FIG. 7. The lower die lip 111 is moved more backward than the intermediate die lip 121 or the upper die lip 131. The distance between the intermediate die lip 121 and the upper die lip 131 and the current collector is 150 μm which is equal to comparative example, and the step D' between the upper slot 102 and the lower slot 101 is 60 μm. The movement speed of the current collector is 40 m/min.

Natural graphite on earth, carbon black, carboxylmethylcellulose (CMC) and styrene butadiene rubber (SBR) having the average particle size $D_{50}$ of 11 μm are mixed with water at a weight ratio of 94:1.5:2:2.5 to the second electrode active material slurry 160 having 50 wt % concentration of the remaining components except water. Natural graphite on earth, carbon black, carboxylmethylcellulose (CMC) and styrene butadiene rubber (SBR) having the average particle size $D_{50}$ of 8 μm are mixed with water at the weight ratio of 94:1.5:2:2.5 to prepare the first electrode active material slurry 150 at 50 wt % concentration of the remaining components except water.

The loading amount of the lower slurry layer **150*a* and the upper slurry layer 160*a*** is 8 mg/cm$^2$ on the basis of the electrode area. The measured length of the loading out area after coating is 3 mm. The current collector coated with the electrode active material slurry is dried while it is allowed to pass through a 60 m long hot air oven, and in this instance, the temperature of the oven is adjusted to maintain 130° C. Subsequent, roll pressing is performed to the target thickness of 180 μm, to obtain a negative electrode. The obtained negative electrode includes the lower active material layer 150*b* and the upper active material layer 160*b*, and as a result of forming a uniform slope without a step while the inclined portion 163 of the upper active material layer 160*b* covers the inclined portion 153 of the lower active material layer 150*b*, a similar cross-sectional profile to FIGS. 8*b* and 10 is obtained.

While the present disclosure has been described with respect to a limited number of embodiments and drawings, the present disclosure is not limited thereto, and it is obvious to those skilled in the art that a variety of changes and modifications may be made thereto within the technical aspects of the present disclosure and the appended claims and their equivalent scope.

Although the terms indicating directions such as up, down, left, and right are used herein, these terms are used only for convenience of description, and it is apparent to those skilled in the art that these terms may be changed depending on a position of a target object or a position of an observer.

What is claimed is:

1. A dual slot die coater for extrusion coating of an electrode active material slurry on a surface of a continuously moving current collector through at least one of a lower slot or an upper slot, the dual slot die coater comprising:

the lower slot, the upper slot, a lower plate, an intermediate plate positioned on the lower plate and an upper plate positioned on the intermediate plate, the lower slot being formed between the lower plate and the intermediate plate, and the upper slot being formed between the intermediate plate and the upper plate, wherein the lower plate, the intermediate plate and the upper plate have a lower die lip, an intermediate die lip and an upper die lip, each forming an front end with respect to the current collector, respectively, and a distance between the current collector and the lower die lip is larger than a distance between the current collector and the upper die lip and a distance between the current collector and the intermediate die lip.

2. The dual slot die coater according to claim 1, further comprising:

a control unit configured to linearly align the lower die lip, the intermediate die lip and the upper die lip with respect to the current collector and then individually move back the lower die lip.

3. The dual slot die coater according to claim 1, wherein a lower exit port in communication with the lower slot is formed between the lower die lip and the intermediate die lip, an upper exit port in communication with the upper slot is formed between the intermediate die lip and the upper die lip, and a predetermined step is formed between the lower exit port and the upper exit port.

4. The dual slot die coater according to claim 3, wherein the lower exit port is configured to deliver the slurry that forms a lower slurry layer onto the current collector, and the upper exit port is spaced apart from the lower exit port downstream in a coating direction and delivers the slurry that forms an upper slurry layer onto the lower slurry layer on the current collector.

5. The dual slot die coater according to claim 4, wherein the step ranges between 20 and 70% of a sum of an average thickness of the lower slurry layer and an average thickness of the upper slurry layer.

6. A method for coating an electrode active material slurry, comprising:

forming an electrode active material slurry layer on the current collector by supplying the electrode active material slurry while moving the current collector from the lower die lip to the upper die lip using the dual slot die coater according to claim 1.

7. A method for coating an electrode active material slurry, comprising:

intermittently coating an electrode active material slurry layer on the current collector by repeating a supply and stop of the electrode active material slurry while moving the current collector from the lower die lip to the upper die lip using the dual slot die coater according to claim 1.

8. A method for coating an electrode active material slurry, comprising:

using a dual slot die coater including a lower slot and an upper slot, to simultaneously extrusion coat two types of electrode active material slurries on a surface of a continuously moving current collector through the lower slot and the upper slot, wherein the dual slot die coater includes a lower plate, an intermediate plate positioned on the lower plate and an upper plate positioned on the intermediate plate, the lower slot being formed between the lower plate and the intermediate plate, and the upper slot being formed between the intermediate plate and the upper plate, wherein the lower plate, the intermediate plate and the upper plate have a lower die lip, an intermediate die lip and an upper die lip, each forming a front end with respect to the current collector, respectively, and a distance between the current collector and the lower die lip is larger than a distance between the current collector and the upper die lip and a distance between the current collector and the intermediate die lip, simultaneously delivering the two types of electrode active material slurries on the current collector moving from the lower die lip to the upper die lip direction through a lower exit port and an upper exit port to form a double layer structure including a lower slurry layer and an upper slurry layer coated on the lower slurry layer, wherein the lower exit port in communication with the lower slot is formed between the lower die lip and the intermediate die lip, the upper exit port in communication with the upper slot is formed between the intermediate die lip and the upper die lip, and the upper exit port is spaced apart from the lower exit port downstream in a coating direction.

9. The method for coating an electrode active material slurry according to claim 8, wherein intermittent coating is performed by repeating simultaneous delivery of the electrode active material slurry and simultaneous stopping.

10. The method for coating an electrode active material slurry according to claim 8, wherein a predetermined step is formed between the lower exit port and the upper exit port, and the step ranges between 20 to 70% of a sum of an average thickness of the lower slurry layer and an average thickness of the upper slurry layer.

11. The method for coating an electrode active material slurry according to claim 8, wherein a ratio of an average thickness of the lower slurry layer and an average thickness of the upper slurry layer is 1:3 to 3:1.

* * * * *